United States Patent [19]

Potash et al.

[11] Patent Number: 4,882,739
[45] Date of Patent: Nov. 21, 1989

[54] METHOD FOR ADJUSTING CLOCKS OF MULTIPLE DATA PROCESSORS TO A COMMON TIME BASE

[75] Inventors: Richard J. Potash, Dedham, Mass.; Steven K. Burns, Durham, N.H.

[73] Assignee: Computer Sports Medicine, Inc., Cambridge, Mass.

[21] Appl. No.: 148,493

[22] Filed: Jan. 26, 1988

[51] Int. Cl.$^4$ .............................. H04L 7/00
[52] U.S. Cl. ........................ 375/109; 455/69; 364/569
[58] Field of Search ............... 375/107, 109; 455/69; 342/88; 364/569

[56] References Cited

U.S. PATENT DOCUMENTS

| 3,128,465 | 4/1964 | Brilliant | 375/109 |
| 3,250,896 | 5/1966 | Perkinson et al. | 375/109 |

OTHER PUBLICATIONS

Richard Wallace; "Time Source Synchronizes Computers in Networks"; p. 24; Electronic Engineering Times; 9/21/87.
D. L. Mills; "Network Time Protocol"; M/A–Com Linkabit; 9/85.
D. L. Mills; "Experiments in Network Clock Synchronization"; M/A—Com Limkabit; 9/85.

Primary Examiner—Robert L. Griffin
Assistant Examiner—Marianne Huseman
Attorney, Agent, or Firm—Arthur L. Lessler

[57] ABSTRACT

A master clock is situated at a central data gathering station, and slave clocks are situated at one or more (functionally or spatially) remote stations. Time signals are exchanged between the master clock at the central station and each slave clock at the corresponding remote station. From these signals (i) the transmission time between the central station and the corresponding remote station is determined, and (ii) the ratio between the frequencies of the central station master clock and the corresponding remote station slave clock is determined. The transmission time and clock ratio so determined are averaged between successive determinations to provide improved accuracy. The transmission time value is used to set the slave clock to a reference value accurately corresponding to the time kept by the master clock; and thereafter the clock ratio value is used to insure that the slave clock is incremented at a rate corresponding to the frequency of the oscillator in the master clock. If desired, the master clock can be synchronized to a reference time which is the average of the reference times of the various clocks, and/or to a frequency which is the average of the frequencies of the oscillators in the various clocks.

33 Claims, 11 Drawing Sheets

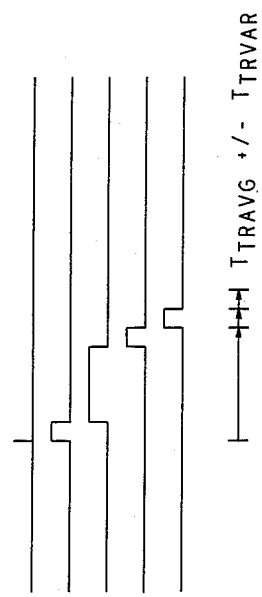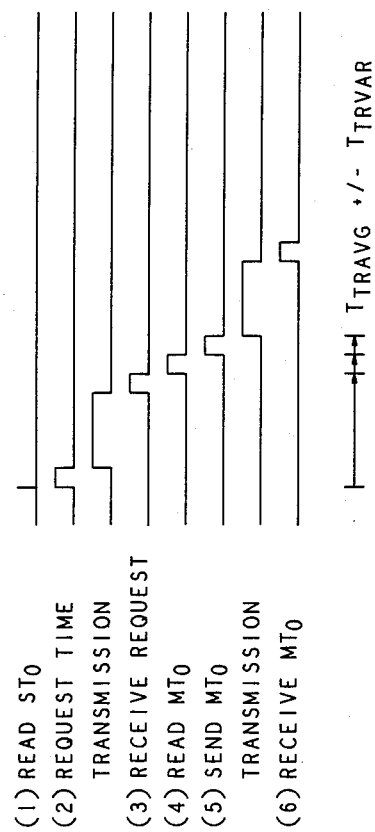
FIG. 9

SHEET 2

METHOD FOR ADJUSTING CLOCKS OF MULTIPLE DATA PROCESSORS TO A COMMON TIME BASE

BACKGROUND OF THE INVENTION

This invention relates to a method for synchronizing at least one slave clock to a master clock, and is particularly applicable to distributed data acquisition and/or data processing systems.

There are many applications in which it is either necessary or desirable to distribute the acquisition or processing of data over a number of computer-controlled stations, usually for reasons related to distance between data-receiving transducers or the need for dividing up a very heavy workload into more manageable subparts, with each subpart being handled by a separate processor. Such applications include monitoring of a common event by multiple satellites (for enhanced reception, triangulation or other purposes) and real-time data acquisition and processing. Process control monitoring and sequence of events recording are among the many other environments which require multiple autonomous data and control streams. Additionally, these tasks demand that the temporal relationships between the data and/or control streams of the various stations involved be preserved.

Thus because of either the spatial requirements or the intense input-output and computational requirements of such data acquisition and/or processing systems, the control and data streams are often distributed among many processors. In order to maintain time synchronization between the data and control streams of the processors, current systems depend on:

1. Shared hardware for their synchronization, typically a common clock and reset line, requiring a direct connection between the common clock and each of the stations to be synchronized to the common clock; or 2. Where a direct connection is not feasible, the wireless transmission of time information from a common clock to each of the stations. In such cases temporal uncertainty due to communications delay determines the overall error in time resolution of the system.

Even where a direct connection is employed, temporal uncertainty limits system time resolution when the distances between stations are substantial.

In a systems having multiple stations it is desirable for each station to have its own clock, so that the station can continue operating even if synchronization with the common clock is temporarily lost. However, such clocks may operate at slightly different frequencies, further compounding the time resolution/synchronization problem.

One arrangement for synchronizing multiple processors is described in an article entitled "Time Source Synchronizes Computers In Networks", published in the Sept. 21, 1987 edition of Electronic Engineering Times. This arrangement utilizes specialized hardware to maintain local clocks synchronized to a national standard.

Accordingly, an object of the present invention is to provide a method for adjusting the clocks of multiple stations (which can but need not necessarily be data acquisition/processing stations) to a common time base.

Another object of the invention is to provide such a method which is capable of minimizing the adverse effects of transmission time.

Still another object of the invention is to provide such a method which is capable of minimizing the effects of variation in clock frequency among the various clocks involved.

Still another object of the invention is to provide such a method which is capable of minimizing the effects of variation in reference time among the various clocks involved.

Yet another object of the invention is to meet the aforementioned objectives through the use of standard data communications means and standard computer operating systems.

SUMMARY OF THE INVENTION

As herein described, according to one aspect of the invention, there is provided a method for synchronizing the frequency of a slave clock to that of a master clock, wherein the master clock provides a master clock time signal and the slave clock provides a slave clock time signal. The slave clock time signal frequency and reference time values can be set independently.

A time interval commencement signal is transmitted from the master clock to the slave clock. The time interval commencement signal has a value corresponding to the value of the master clock time signal when the time interval commencement signal is transmitted. A time interval termination signal is subsequently transmitted from the master clock to the slave clock. The time interval termination signal has a value corresponding to the value of the master clock time signal when the time interval termination signal is transmitted.

After receipt of the time interval termination signal at the slave clock, the ratio $k_{clkratio}$ of the two clock frequencies is computed as the ratio of (i) the difference between the values of the time interval commencement and time interval termination signals to (ii) the elapsed time between reception of the time interval commencement and time interval termination signals as determined by the slave clock.

An adjusted slave clock time signal is then generated at the slave clock, the adjusted slave clock time signal having a value which increases with time by an amount proportional to the product of the number of periodic slave clock time increment signals with $k_{clkratio}$.

According to another aspect of the present invention there is provided a method for synchronizing the reference time of at least one slave clock to that of a master clock. The master clock provides a master clock time signal and the slave clock provides a slave clock time signal and periodic slave clock time increment signals.

According to this aspect of the invention, a first reference time signal is transmitted from the slave clock to the master clock, said signal having a value corresponding to the value of the slave clock time signal when the first reference time signal is transmitted. A second reference time signal is subsequently transmitted from the master clock to the slave clock, said signal having a value corresponding to the value of the master clock time signal when the first reference time signal was received by the master clock. A third reference time signal is transmitted from the master clock to the slave clock, said signal having a value corresponding to the value of the master clock time signal when the third reference time signal is transmitted.

After receipt of the third reference time signal at the slave clock, the reference time is computed by:
adding the value of said slave clock time signal at the time of transmission of said first reference signal, to the value of said slave clock time signal at the time of reception of said third reference signal at said slave clock, to obtain a first subtotal value;

multiplying said first subtotal value by the ratio of the frequency of said master clock to the frequency of said slave clock to obtain an adjusted subtotal value;

subtracting said adjusted subtotal value from the sum of the values of said second and third reference time signals, to obtain a further adjusted subtotal value; and dividing said further adjusted subtotal value by two to obtain the reference time value.

The slave clock is then adjusted by an amount equal to the reference time value so determined.

BRIEF DESCRIPTION OF THE DRAWINGS

FIG. 9 is a timing diagram for the determination of the reference time $t_{ref}$ at said one satellite station;

PRINCIPLES OF THE PRESENT INVENTION

Figure 1:
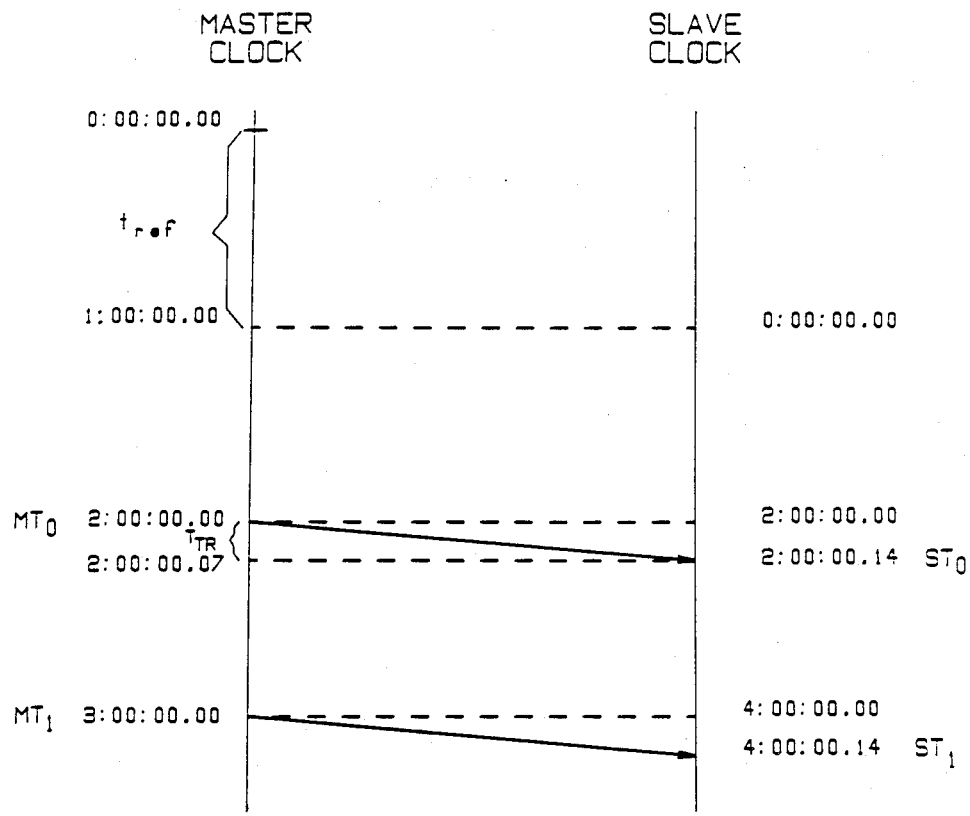
FIG. 1 is a diagram illustrating principles of the present invention involved in the determination of the difference in frequency between the slave clock at one of a number of data gathering and/or processing stations and the master clock at a central station.

Where a system is operated with multiple clocks, each clock normally operates by counting clock pulses generated by a local oscillator, and by incrementing a starting time to which the clock is initially set, in accordance with the number of pulses counted.

The term "clock" as used in this application, refers to an arrangement which includes a local oscillator for generating periodic clock signals, a counter for counting the clock signals to generate an initial digital time signal; and an associated processor for converting the initial digital time signal generated by the counter to a desired time signal in accordance with desired reference time and/or frequency standards.

According to the present invention, the local oscillator frequency is not adjusted to match a desired frequency standard. Rather, the relationship between the initial digital time signal and the desired time signal is changed accordingly.

Similarly, the desired time signal is changed to correspond to a desired reference time standard.

In order to insure that data acquired by multiple data gathering stations (each station having its own clock) relating to an event is properly coordinated, all clocks should indicate the same "absolute" time. However, this is not possible due to (i) delays in the time of transmission of time signals from one clock to another, and (ii) small differences in frequency and reference time between the clocks.

The present invention provides methods for determining the transmission time between clocks and the frequency ratios and differences in reference time between clocks with a very high degree of accuracy, so that the clocks can be synchronized to an extent not heretofore possible.

According to a preferred embodiment of the invention, a master clock is situated at a central data gathering station, and slave clocks are situated at one or more (functionally or spatially) remote stations. Time signals are exchanged between the master clock at the central station and each slave clock at the corresponding remote station. From these signals (i) the transmission time between the central station and the corresponding remote station is (directly or indirectly) determined, (ii) the ratio between the frequencies of the central station master clock and the corresponding remote station slave clock is determined, (iii) the difference between the reference times of the central station master clock and the corresponding remote station slave clock is determined.

The output of the slave clock is adjusted by a time increment equal to the reference time, and incremented at a rate adjusted by the ratio between the frequencies of the master and slave clocks so that the frequency of the slave clock is then synchronized to that of the master clock.

All comparisons of reference time and frequency between the master clock and the slave clock are carried out using the "raw" slave clock time signal. This "raw" time signal is then processed to provide the adjusted slave clock time signal which is used (for data acquisition, for control of radiation of signals or firing or launching operations, or the like) to ensure synchronous operation of functions controlled by the slave clock and the master clock.

The time interval over which the ratio of the frequencies of the master and slave clocks is determined is preferably as long as is practicable, for greatest accuracy.

In order to obtain as accurate a calculation of the reference time and transmission time as possible, the number of signals exchanged between the master and slave clocks should be as great as possible. These signals are averaged to provide improved accuracy.

The reference time value is used to adjust the slave clock to a value accurately corresponding to the time kept by the master clock; and the clock ratio value is used to insure that the slave clock is incremented at a rate corresponding to the frequency of the oscillator in the master clock. If desired, the master clock can be synchronized to a reference time which is the average of the reference times of the various clocks, and/or to a frequency which is the average of the frequencies of the oscillators in the various clocks.

The manner in which the slave clock local oscillator frequency is referenced to the frequency of the master clock oscillator is illustrated in FIG. 1.

Figure 2:
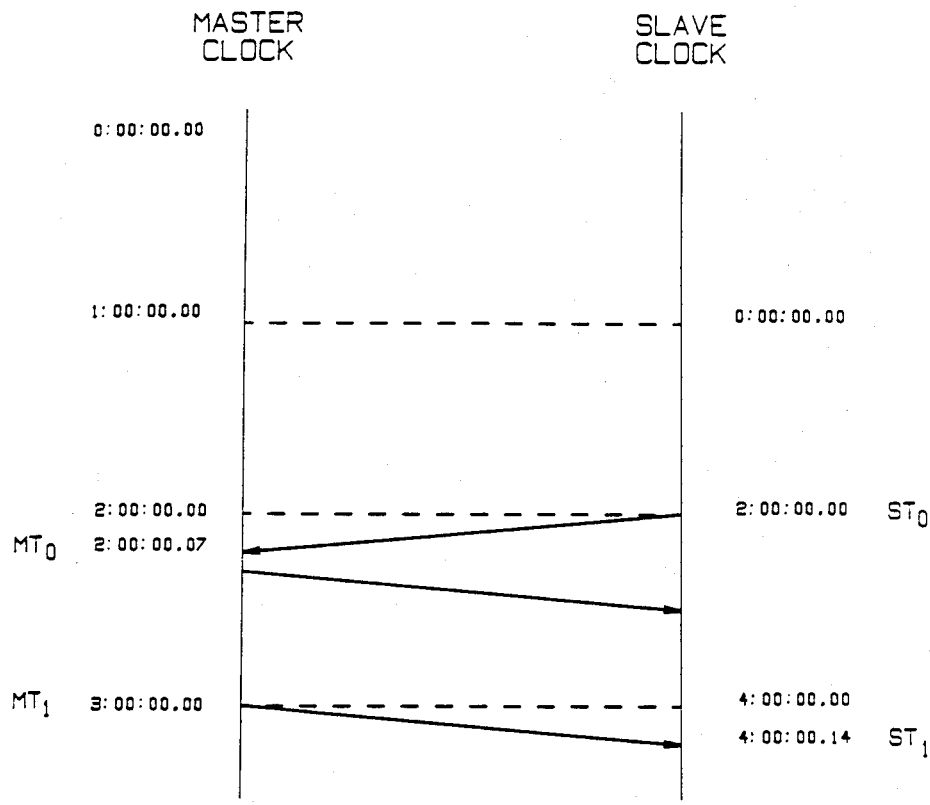
FIG. 2 is a diagram illustrating principles of the present invention involved in the determination of the difference between the reference time of a slave clock at one of a number of data gathering and/or processing stations and the reference time of a master clock at the central station, as well as the transmission time betwen said clocks.

In FIGS. 1 and 2 time values are shown in HH:MM:SS.FF form, where HH=hours, MM=minutes, SS=seconds and FF denotes the number of hundredths of a second.

A time signal sequence is initiated by, for example, the master clock transmitting to the slave clock a first time signal (which may be a time interval commencement signal) having a value $MT_0$ corresponding to the master clock time at which the signal is sent, e.g. 2:00:00.00 p.m. (i.e., two hours after the master clock starting time of 0:00:00.00 as measured by the master clock). Assuming a 0.07 second (as measured by the master clock) transmission time, that the master clock has a local oscillator operating at one-half the frequency of the slave clock local oscillator, and that the master clock is initially running 1:00:00.00 (one hour) ahead of the slave clock, the slave clock would receive the first signal (with value $MT_0$) at a time $ST_0$ of 2:00:00.14 p.m. as determined by the slave clock.

A second time signal (which may be a time interval termination signal) $MT_1$ with master clock value of 3:00:00.00 p.m. is transmitted to the slave clock. The slave clock would receive the second time signal (with value $MT_1$ at a time $ST_1$ of 4:00:00.14 p.m. as determined by the slave clock.

The clock ratio $k_{clkratio}$, i.e. the ratio of the master clock local oscillator frequency to the slave clock local oscillator frequency, is given by the ratio of the elapsed time between transmission of the first (time interval commencement) and second (time interval termination) signals as measured by the master clock, to the elapsed time between reception of those signals as measured by the slave clock.

In this example, the ratio would be $k_{clkratio}$=(b 3:00:00.00—2:00:00.00/(4:00:00.14—2:00:00.14)=1:00:-00.00/2:00:00.00=0.50.

The manner in which the reference time of the slave clock is referenced to that of the master clock is illustrated in FIG. 2.

A first time signal $ST_0$ is transmitted from the slave clock to the master clock. The first time signal has a value corresponding to the value of the slave clock time signal at the time when the first time signal is transmitted, i.e. 2:00:00.00 p.m.

A second time signal $MT_0$ is subsequently transmitted from the master clock to the slave clock. The second time signal has a value corresponding to the value of the master clock time signal when the first time signal was received by the master clock, i.e. 2:00:00.07 p.m.

A third time signal $MT_1$ is subsequently transmitted from the master clock to the slave clock. The third time signal has a value corresponding to the value of the master clock time signal when the third time signal was transmitted by the master clock, i.e. 3:00:00.00 p.m. The slave clock would receive the third signal (with value $MT_1$) at a time $ST_1$ of 4:00:00.14 p.m. as determined by the slave clock.

Upon receipt of the second and third time signals at the slave clock, the slave clock determines the reference time $t_{ref}$ by subtracting (i) the sum of the measured times on its clock (6:00:00.14) times the clock frequency ratio (0.50) from (ii) the sum of the measured times at the master clock between reception of the first time signal and transmission of the third time signal (5:00:00.07), and dividing the difference by 2, to yield a reference time of 1:00:00.00.[(2:00:00.07+3:00:00.00)−(2:00:00.00+4:00-:00.14) *0.50]/2=1:00:00.00.

The slave clock then determines the transmission time $T_{TR}$ by adding (i) the time difference at the master clock between transmission of the third time signal and reception of the first time signal (−0:59:59.93) to (ii) the time that has transpired on its clock (2:00:00.14) times the clock ratio (0.50), and dividing the sum by 2, to yield a transmission time of 0.07 seconds. [(2:00:00.07−3:00:00.00)+(4:00:00.14−2:00:00.00) * 0.50]/2=0.07.

In order to improve the accuracy of determining the parameters $k_{clkratio}$, $t_{ref}$, and $T_{TR}$, the average of successive measurements of the time signals is used. The measurements of $k_{clkratio}$ can be carried out from time to time, but the accuracy of the measurement is determined by the total interval over which the measurements are made.

The measurements of $t_{ref}$ and $T_{TR}$ can be carried out from time to time, but measurements based upon multiple time exchanges are preferred for greatest accuracy.

The equations that apply to the foregoing operations are:

$$k_{clkratio}=(MT_1-MT_0)/(ST_1-ST_0) \quad (1)$$

$$t_{ref}=[(MT_0+MT_1)-(ST_0+ST_1) * k_{clkratio}]/2 \quad (2)$$

$$T_{TR}=[(MT_0-MT_1)+(ST_1-ST_0) * k_{clkratio}]/2 \quad (3)$$

The slave clock recalculated (virtual clock) time $T_{vc}$ is given by $$T_{vc}=t_{ref}+n_{pc} * k_{clkratio} \quad (4)$$

where $n_{pc}$ is the number of periodic slave clock time increment signals generated.

DETAILED DESCRIPTION

According to the synchronization technique of the present invention, the clock system at each (spatially or functionally) remote station models a virtual or "world" clock (e.g. the master clock at the central station) in terms of its own local physical (slave) clock; and uses information gathered from communication with the master clock to closely approximate the model's parameters.

The following mathematical model of time is used:

$$T_{vc}=t_{ref}+n_{pc} * k_{clkratio} \quad (5)$$

Where $T_{vc}$, the virtual (master) clock time (i.e. the adjusted slave clock time), is an absolute quantity expressed in terms of the modeling parameter $t_{ref}$ (the reference time of the virtual clock) and $k_{clkratio}$ (the ratio between the frequencies of the virtual (master) clock and the physical (slave) clock) and the physical parameter $n_{pc}$ (the number of ticks or periods which have elapsed on the physical (slave) clock in the remote processor).

By using a small part of its computational power to process message based exchanges of time data with another (master clock) processor, the processor at each station determines the parameters $t_{ref}$ and $k_{clkratio}$ and thus can compute the virtual (master) clock time $T_{vc}$ from $n_{pc}$, its physical (slave) clock time and vice versa.

Figure 3:
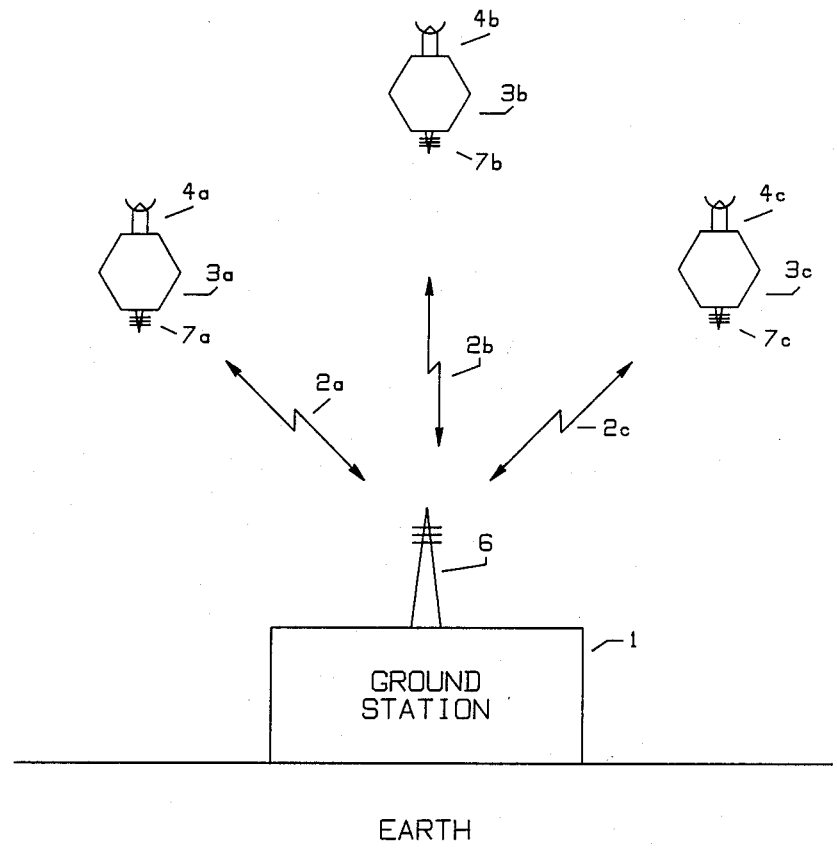
FIG. 3 is a diagram of a set of three data acquisition radar satellite stations communicating with a common ground station.

The system depicted in FIG. 3 consists of a ground station 1 and a number of satellites 3a, 3b and 3c. The ground station 1 communicates with the satellites via transmissions over bidirectional radio links 2a, 2b and 2c respectively. The ground station has a radio transmittion/reception antenna 6 while the satellites have radio transmission/reception antennae 7a, 7b and 7c respectively. Each satellite contains a radar system (4a, 4b, 4c).

The ground station 1 sends a message to each of the satellites telling them what time to send a radar pulse toward an area where it is desired to detect an object. The radar pulses must be sent from all satellites at the same time, or at times coordinated so that a desired phased array effect can be achieved.

Upon sending its radar pulse, each satellite samples the amplitude of the incoming signals received at its radar dish and determines the (adjusted (to master clock time) slave clock time) when the peak (maximum amplitude) signal occurred. The peak occurrence time along with the sampled data is stored in the memory of the satellite processor. This occurrence time and sampled data is then transmitted to the ground station.

The ground station compares the received peak (time and amplitude) occurrence data from the set of satellites and determines if an object has been detected. If so, the satellites are instructed to send their complete sets of data samples for further analysis by the ground station.

For the satellites to send the radar pulses at the same time (or at coordinated times) and for the ground station to compare the data streams from the group of satellites, the satellites must each measure time by the same standard, i.e. a common virtual clock from which to temporally reference their actions and data.

Since the ground station equipment is under fewer constraints than the satellites, it makes sense to provide it with a very accurate absolute or "master" clock and use it as the "virtual" clock to which all the satellites must time-synchronize. Each satellite then computes the model parameters $t_{ref}$ and $k_{clkratio}$ and adjusts or corrects its "slave" clock time values such that the data sent to the ground stations is as though the satellites used the actual ground station master clock as their time base for the data acquisition. Additionally, each satellite synchronizes all its actions relative to the ground station master clock.

Figure 4:
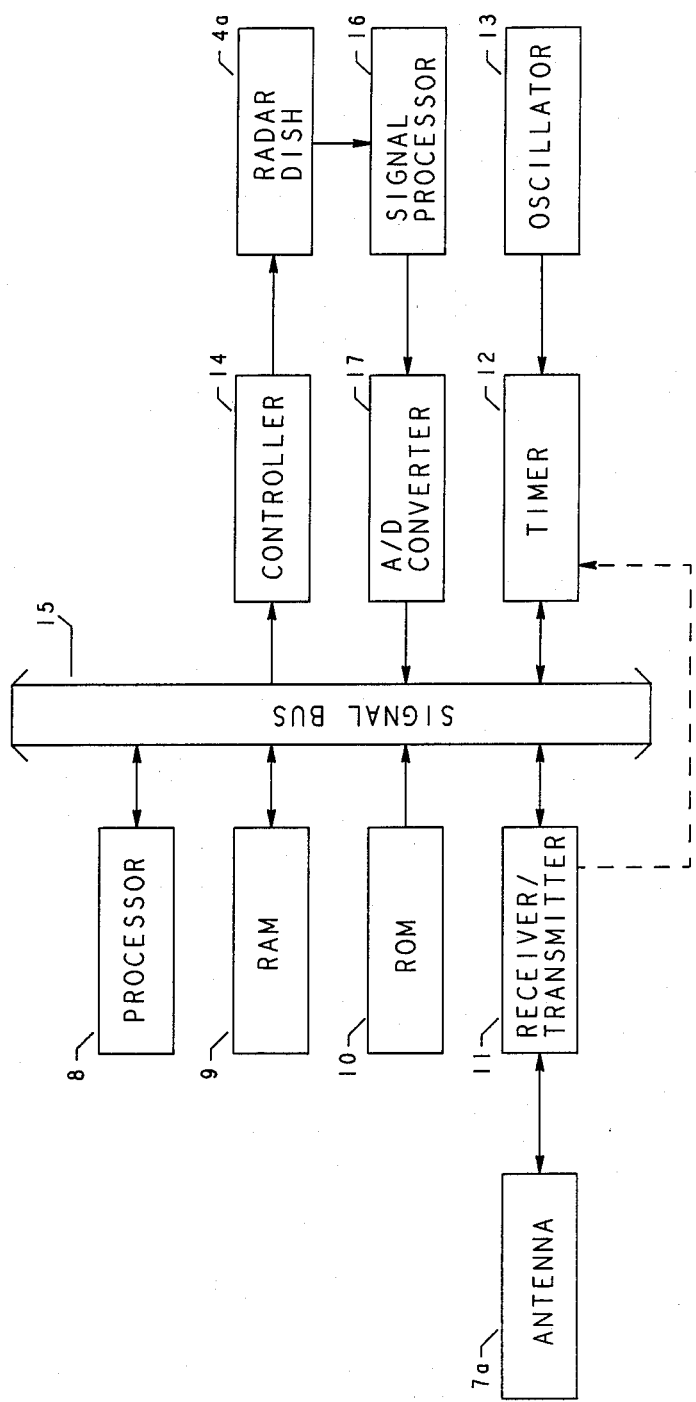
FIG. 4 is a block diagram of the data acquisition and synchronization circuitry of one of said satellite stations.

FIG. 4 shows a block diagram of the data acquisition and synchronization circuitry of one of said satellite stations.

The data processor 8 controls the system and performs the computations associated with the time corrections.

The random access memory or RAM 9 contains the timing variables ($t_{ref}$, $k_{clkratio}$), the raw collected data, and the time-synchronized collected data.

The read only memory or ROM 10 contains the programs associated with system control and time-synchronization.

The receiver/transmitter 11 communicates with the ground station.

The timer 12 is a simple counter driven by the local oscillator 13.

The oscillator 13 provides the driving frequency for the timer 12, which counts pulses derived from the oscillator. The frequency of the oscillator cannot be set exactly and thus will vary slightly among the satellites.

The controller 14 receives commands from the data processor 8 via the common signal bus 15 and sends out radar pulses via the radar dish 4a.

Radar signals received by the radar dish 4a are coupled to the signal processor 16, which transforms them to levels acceptable for the analog-to-digital (A/D) converter 17.

The A/D converter 17 receives the analog data from the signal processor 16 and converts it to a stream of digital data for the data processor 8.

Determination of the Time Parameters

Transmission Time Model

Figure 5:
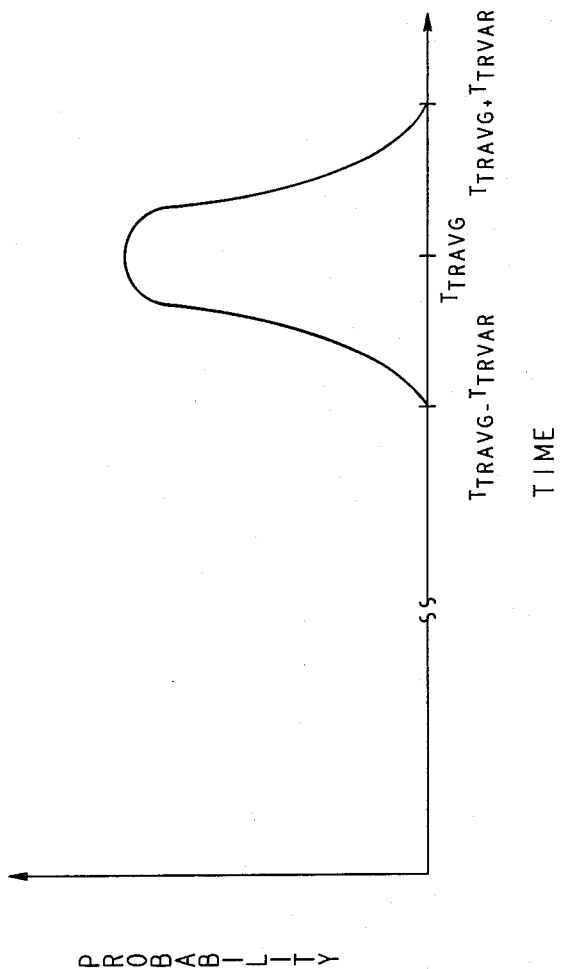
FIG. 5 is a graph showing the probability distribution of the signal transmission time between one of the satellite stations and the ground station.

Time values are bidirectionally transmitted between the ground station and the satellites, as previously described. The transmission time $T_{TR}$ is defined as the time required for the time message to be generated, transmitted, received and acted upon. The uncertainty of the time period required for the transmission of time information can be reduced by directly linking the timer 12 to the receiver/transmitter 11, as shown by the dashed line in FIG. 4. $T_{TR}$ can be modeled as an average value $T_{TRavg}$ with a limited variation $T_{TRvar}$. (See FIG. 5). That is, $$T_{TR} = T_{TRavg} + T_{TRvar} \tag{6}$$

If deviations in $T_{TR}$ from $T_{TRavg}$ are essentially independent, then averaging successive observations of $T_{TR}$ should improve the determination of $T_{TRavg}$ by the square root of the number of observations. The techniques of the present invention make extensive use of this averaging to increase the system performance of the system beyond the limits imposed by a single determination of $T_{TRavg}$.

The present invention utilizes the time of transmission of a time signal as measured by the transmitter's clock and the time of reception of the same time signal as measured by the receiver's clock. The absolute time difference between transmission and reception of a time signal is defined as the transmission time. Thus, Equation (5) must be modified to account for the transmission time when equating transmission and reception time values.

For time signals transmitted from the master clock to the slave clock, the equation becomes:

$$MT = ST * k_{clkratio} + t_{ref} - T_{TR} \tag{7}$$

For time signals transmitted from the slave clock to the master clock, the equation becomes:

$$MT - T_{TR} = ST * k_{clkratio} + t_{ref} \tag{8}$$

Determination of the Ratio of the Ground Station (Master) and Satellite (Slave) Clock Frequencies The technique employed for the determination by a satellite of the difference between its (slave) clock frequency and the ground station's (master) clock frequency is to measure the same elapsed time interval with the ground station clock and the satellite clock. The measured value of elapsed time is directly proportional to the measuring clock's frequency. Thus the ratio of the measurements of elapsed time provides a value for $k_{clkratio}$.

Figure 6:
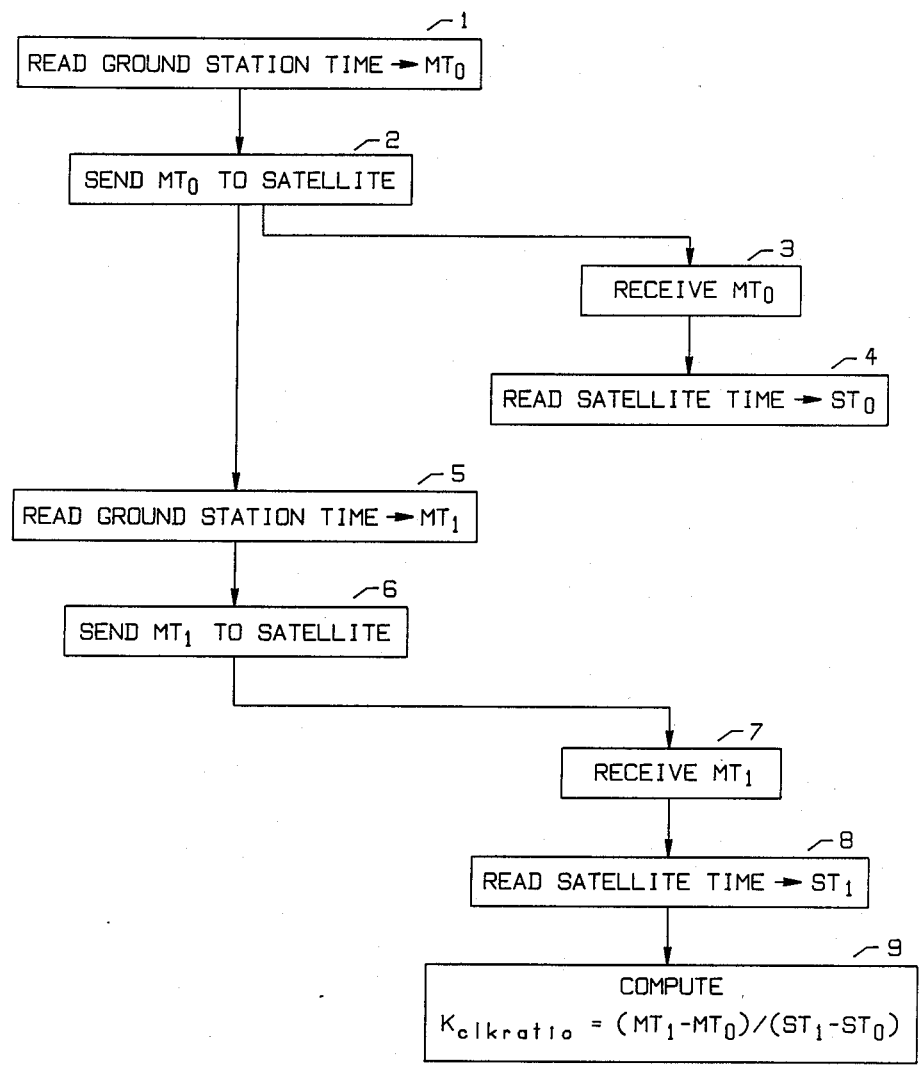
FIG. 6 is a flow chart showing the synchronization signal processing steps which take place at said one satellite station and at the ground station for the determination of the ratio ($k_{clkratio}$) between the frequency of the master clock at the ground station and the frequency of the slave clock at the satellite station.
Figure 7:
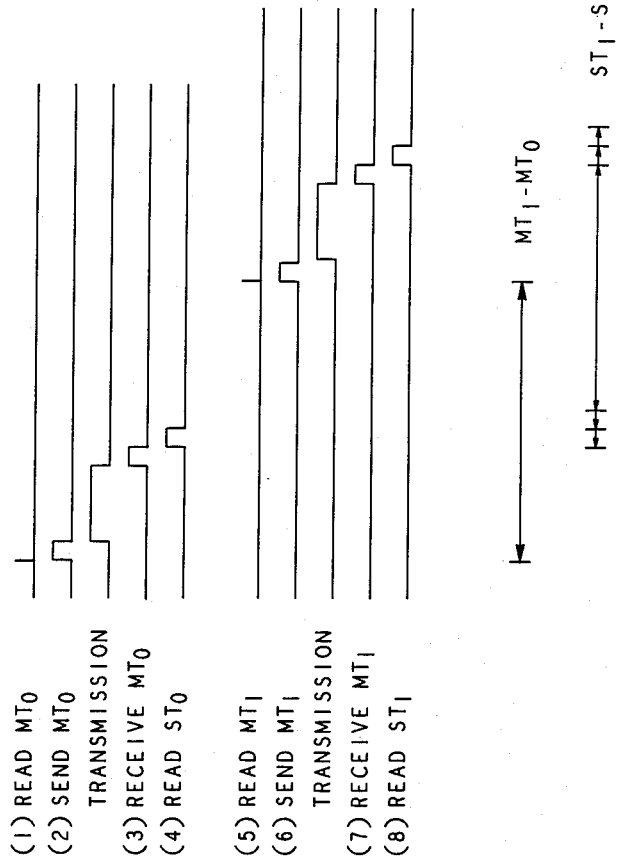
FIG. 7 is a timing diagram for the determination of the frequency ratio $k_{clkratio}$ by said one satellite station.

As seen in FIG. 6, at time $MT_0$ the ground station records the time on its clock (Step 1). The ground station then sends a message to the satellite (Step 2) containing the time value $MT_0$. Te satellite receives the message (Step 3) and reads the time $ST_0$ on its clock (Step 4).

At time $MT_1$ the ground station records the time on its clock (Step 5). The ground station then sends a message to the satellite (Step 6) containing the time value $MT_1$. The satellite receives the message (Step 7) and reads the time $ST_1$ on its clock (Step 8).

The satellite now has the values $ST_0$, $ST_1$, $MT_0$ and $MT_1$.

Substituting the pairs of time values $MT_0$, $ST_0$) and ($MT_1$, $ST_1$) into Equation (7) yields:

$$MT_0 = ST_0 * k_{clkratio} + t_{ref} - T_{TR} \quad (9)$$

$$MT_1 = ST_1 * k_{clkratio} + t_{ref} - T_{TR} \quad (10)$$

Subtracting (9) from (10):

$$(MT_1 - MT_0) = (ST_1 - ST_0) * k_{clkratio} + t_{ref} - t_{ref} - T_{TR} + T_{TR} \quad (b\ 11)$$

The $t_{ref}$ terms cancel because $t_{ref}$ is a constant defining the relationship between the starting times of the two clocks.

Substituting Equation (6) into Equation (11) yields:

$$(MT_1 - MT_0) = (ST_1 - ST_0) * k_{clkratio} - \quad (12)$$
$$T_{TRavg} \pm T_{TRvar} + T_{TRavg} \pm T_{TRvar}$$

The average transmission time $T_{TRavg}$ about which the transmission time varies (by an amount corresponding to $T_{TRvar}$) is a constant, so that the $T_{TRavg}$ terms cancel. Thus the full equation for $k_{clkratio}$ is:

$$k_{clkratio} = \frac{(MT_1 - MT_0)}{(ST_1 - ST_0)} +/- \frac{2 * T_{TRvar}}{(ST_1 - ST_0)} \quad (13)$$

The satellite now makes an estimate of $k_{clkratio}$ (Step 9) using Equation (14):

$$k_{clkratio} = (MT_1 - MT_0)/(ST_1 - ST_0) \quad (14)$$

It can be seen that the maximum error in this estimate of $k_{clkratio}$ is:

$$Error_{max} = \pm 2 * T_{Trvar}/(ST_1 - ST_0) \quad (15)$$

In order to reduce the error and thus improve the accuracy of the estimate, the master clock transmits subsequent time interval termination signals. The slave clock uses the most recently received termination signal (transmitted at time $MT_n$ as measured by the master clock and received at time $ST_n$ as measured by the slave clock) to compute a more accurate estimate of $k_{clkratio}$ using Equation (16):

$$k_{clkratio} = (MT_n - MT_0)/(ST_n - ST_0) \quad (16)$$

thus reducing the error term toward zero as the time interval $ST_n - ST_0$ approaches infinity.

Determination of Reference Time

The reference time determination method of the present invention yields best results when the average transmission time from the ground station to the satellite is equal to the average transmission time from the satellite to the ground station, as is normally the case; and when the technique described in this application for determining the relationship between the frequencies of the master and slave clocks is also employed.

Figure 8:
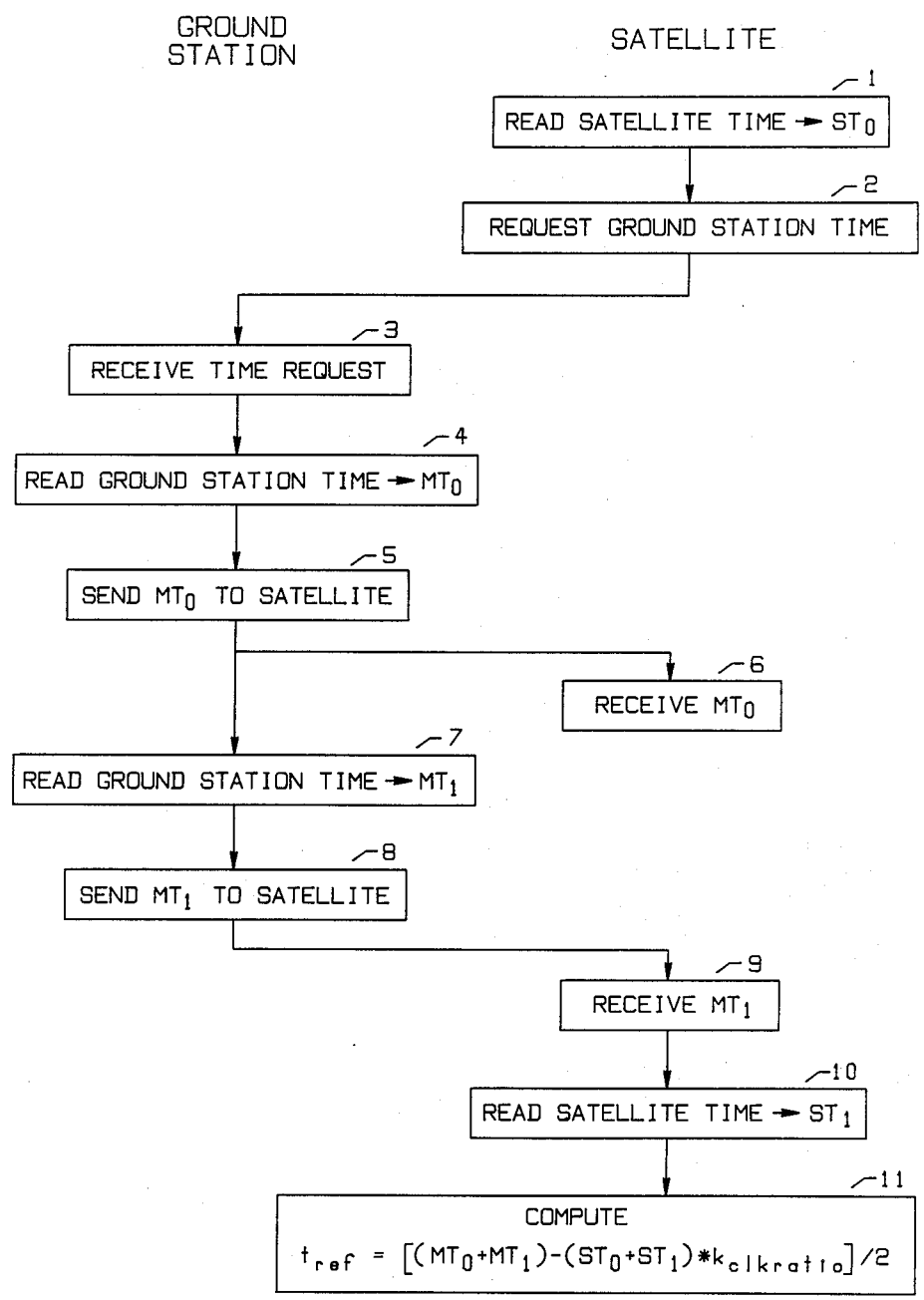
FIG. 8 is a flow chart showing the synchronization signal processing steps which take place at said one satellite station and at the ground station for the determination of the reference time ($t_{ref}$) by which the slave clock of the satellite station is to be adjusted so as to correspond to the time of the master clock at the ground station.

As seen in FIG. 8, at time $ST_0$ the satellite records the time on its (slave) clock (Step 1). The satellite then sends a message to the ground station (Step 2) requesting the ground station to read and return the value on its (master) clock. The ground station receives the message (Step 3), reads the time $MT_0$ on its (master) clock (Step 4), and sends this time to the satellite (Step 5). The satellite receives the time and records it as $MT_0$ (Step 6).

The ground station reads the time $MT_1$ on its (master) clock (Step 7), and sends this time to the satellite (Step 8). The satellite receives the time and records it as $MT_1$ (Step 9). The satellite then reads its (slave) clock and records the time the message was received (Step 10) as $ST_1$.

The satellite now has four pieces of information, viz. $ST_0$, $MT_0$, $ST_1$, and $MT_1$.

Substituting the variables $ST_0$, $MT_0$, $ST_1$ and $MT_1$ into Equations (7) and (8) yields:

$$MT_0 - T_{TR} = t_{ref} + ST_0 * k_{clkratio} \quad (b\ 17)$$

$$MT_1 = t_{ref} + ST_1 * k_{clkratio} - T_{TR} \quad (b\ 18)$$

Adding Equations (17) and (18) gives:
$$MT_0 + MT_1 - T_{TR} = t_{ref} + ST_O * k_{clkratio} + t_{ref} + ST_1 * k_{clkratio} - T_{TR} \quad (19)$$

which reduces to:

$$t_{ref} = [(MT_0 + MT_1) - (ST_0 + ST_1) * k_{clkratio}]/2 \quad (20)$$

Thus $t_{ref}$ can be computed from a set of message exchanges between the ground station 1 and the satellite (FIG. 8, Step 11).

Subtracting Equation (18) from Equation (17) gives:

$$(MT_0 - MT_1) = (ST_0 - ST_1) * k_{clkratio} + t_{ref} - t_{ref} + T_{TR} + T_{TR} \quad (21)$$

which reduces to $$T_{TR} = [(MT_0 - MT_1) + (ST_1 - ST_0) * k_{clkratio}]/2 \quad (22)$$

Thus the transmission time $T_{TR}$ can also be computed from a set of message exchanges between the ground station and the satellite.

Such a set of exchanges also provides an alternate method of computing the value of $k_{clkratio}$. That is, solving Equation (22) for $k_{clkratio}$ yields:

$$k_{clkratio} = \frac{(MT_1 - MT_0)}{(ST_1 - ST_0)} +/- \frac{2 * T_{TR}}{(ST_1 - ST_0)} \quad (23)$$

Although the error term of Equation (23) [±2 * $T_{TR}$/($ST_1-ST_0$)] is larger than the error term of Equation (13) [±2 * $T_{TRvar}$/($ST_1-ST_0$)], both approach zero as the time interval approaches infinity.

In order to increase the accuracy of the above calculations, the slave clock may transmit a number of master clock read messages to the master clock, each message causing the master clock to read and accumulate the value of the master clock output at the time $MT_A$ that the corresponding message is received. At the same time, the slave clock reads and accumulates the value of its output at the time $ST_A$ that each corresponding master clock read message is transmitted.

The master clock transmits a number of slave clock read messages to the slave clock, each such message causing the slave clock to read and accumulate the value of the slave clock output at the time $ST_b$ that the corresponding message is received. At the same time, the master clock reads and accumulates the value of its output at the time $MT_B$ that each corresponding slave clock read message is transmitted. The number $n_b$ of such messages need not necessarily be equal to the number $n_a$ of master clock read messages transmitted by the slave clock to the master clock.

[In the following equations the multiplication symbol * has been omitted before summation symbols for purposes of clarity].

Summing Equation (8) over $n_a$ transmissions yields
$$\Sigma MT_A - \Sigma T_{TRA} = K\Sigma ST_A + \Sigma t_{ref} \quad (24)$$
where $\Sigma MT_A$ is the sum of the master clock times of reception of the $n_a$ master clock read messages transmitted by the slave clock to the master clock $\Sigma T_{TRA}$ is the sum of the transmission times of $n_a$ master clock read messages K is the ratio $k_{clkratio}$ of the master clock frequency to the slave clock frequency $\Sigma ST_A$ is the sum of the slave clock times of transmission of the $n_a$ master clock read messages $\Sigma t_{ref}$ is the sum of na corresponding values of $t_{ref}$.
Since $t_{ref}$ is a constant,
$$\Sigma t_{ref} = n_a * t_{ref} \quad (b\ 25)$$

Substituting Equation (25) into Equation (24):

$$\Sigma MT_A - \Sigma T_{TRA} = K\Sigma ST_A + n_a * t_{ref} \quad (26)$$

Dividing Equation (26) by $n_a$ yields:

$$\frac{\Sigma MT_A}{n_a} - \frac{\Sigma T_{TRA}}{n_a} = \frac{K\Sigma ST_A}{n_a} + t_{ref} \quad (27)$$

Substituting $T_{TRA}$ for $\Sigma T_{TRA}/n_a$ in Equation (27);

$$\frac{\Sigma MT_A}{n_a} - T_{TRA} = \frac{K\Sigma ST_A}{n_a} + t_{ref} \quad (28)$$

Performing a similar derivation on Equation (7) over $n_b$ transmissions yields:

$$\frac{\Sigma MT_B}{n_b} = \frac{K\Sigma ST_B}{n_b} + t_{ref} - T_{TRB} \quad (29)$$

Adding Equations (28) and (29):

$$\frac{\Sigma MT_A}{n_a} + \frac{\Sigma MT_B}{n_b} = K\left(\frac{\Sigma ST_A}{n_a} + \frac{\Sigma ST_B}{n_b}\right) + \quad (30)$$

$$t_{ref} + t_{ref} + T_{TRA} - T_{TRB}$$

$$2 * t_{ref} = \frac{n_b \Sigma MT_A + n_a \Sigma MT_B}{n_a n_b} - \quad (31)$$

$$K\left(\frac{n_b \Sigma ST_A + n_a \Sigma ST_B}{n_a n_b}\right) - T_{TRA} + T_{TRB}$$

$$t_{ref} = \frac{(n_b \Sigma MT_A + n_a \Sigma MT_B) - K(n_b \Sigma ST_A + n_a \Sigma ST_B)}{2 n_a n_b} - \quad (32)$$

$$\frac{T_{TRA} + T_{TRB}}{2}$$

Expanding $T_{TRA}$ and $T_{TRB}$ with Equation 6:

$$-T_{TRA} + T_{TRB} = -\frac{\Sigma T_{TRavga}}{n_a} \pm \frac{\Sigma T_{TRvara}}{n_a} + \quad (33)$$

$$\frac{\Sigma T_{TRavgb}}{n_b} \pm \frac{\Sigma T_{TRvarb}}{n_b}$$

wherein $\Sigma T_{TRavgn}/n$ is the average transmission time over n trials

If the average transmission time from the master clock to the slave clock is assumed to be equal to the average transmission time from the slave clock to the master clock, then:

$$\frac{\Sigma T_{TRavga}}{n_a} = \frac{\Sigma T_{TRavgb}}{n_b} \quad (34)$$

wherein $\Sigma T_{TRvarn}/n$ is the average of n observations of the variation ($T_{TRvar}$) transmission time. If $T_{TRvar}$ is statistically distributed about 0 then:

$$\lim_{n \to \infty} \frac{\Sigma T_{TRvarn}}{n} = 0 \quad (35)$$

Thus $T_{TRA} = T_{TRB}$ and Equation (32) reduces to:

$$t_{ref} = [(n_b \Sigma MT_A 30\ n_a \Sigma MT_B) - K(n_b \Sigma ST_A + n_a \Sigma ST_B)]/2 n_a n_b \quad (36)$$

Let $WS_m = n_b \Sigma MT_A + n_a \Sigma MT_B \quad (b\ 37)$ $$WS_s = n_b \Sigma ST_A + n_a 93\ ST_B \quad (38)$$

where $WS_m$ and $WS_s$ represent weighted sums of the transmission and reception times being accumulated by the master and slave clocks respectively.

After a desired number $n_a$ of transmissions of master clock read messages and a desired number $n_b$ of transmissions of slave clock read messages, the master clock sends the slave clock the accumulated value $WS_m$. The slave clock then computes the value of $t_{ref}$ as follows:
$$t_{ref} = (WS_m - K * WS_s)/2 n_a n_b \quad (39)$$

thus producing a more accurate estimate of $t_{ref}$ than can be obtained from a single set of exchanges, by reducing errors due to transmission time variations.

Subtracting Equation (29) from Equation (28) yields:

$$\frac{\Sigma MT_A}{n_a} - \frac{\Sigma MT_B}{n_b} = K\left(\frac{\Sigma ST_A}{n_a} - \frac{\Sigma ST_B}{n_b}\right) + \quad (40)$$

$$t_{ref} - t_{ref} + T_{TRA} + T_{TRB}$$

which reduces to $$T_{TRA} + T_{TRB} = [(n_b\Sigma MT_A - n_a\Sigma MT_B) + K(n_a\Sigma ST_B - n_b\Sigma ST_A)]/n_a n_b \quad (41)$$

From the previous analysis of $T_{TRA}$ and $T_{TRB}$, $$T_{TRA} + T_{TRB} = 2 * T_{TRavg} \quad (42)$$

Therefore the complete formula for $T_{TR}$ is $$T_{TR} = [(n_b\Sigma MT_A - n_a\Sigma MT_B) + K(n_a\Sigma ST_B - n_b\Sigma ST_A)]/2 n_a n_b \quad (b\ 43)$$

Let $WD_m = n_b\Sigma MT_A - n_a\Sigma MT_B \quad (44)$ $$WD_s = n_a\Sigma ST_B - n_b\Sigma ST_A \quad (45)$$

Where $WD_m$ and $WS_s$ are weighted differences of the transmission and reception times being accumulated by the master and slave clocks. After a desired number $n_a$ of transmissions of master clock read messages and a desired number $n_b$ of transmissions of slave clock read messages, the master clock sends the slave clock the accumulated value $WD_m$. The slave clock then computes the value of $T_{TR}$ as follows:

$$T_{TR} = (WD_m + K * WD_s)/2n_a n_b \quad (46)$$

Operation of Radar System

Figure 10:
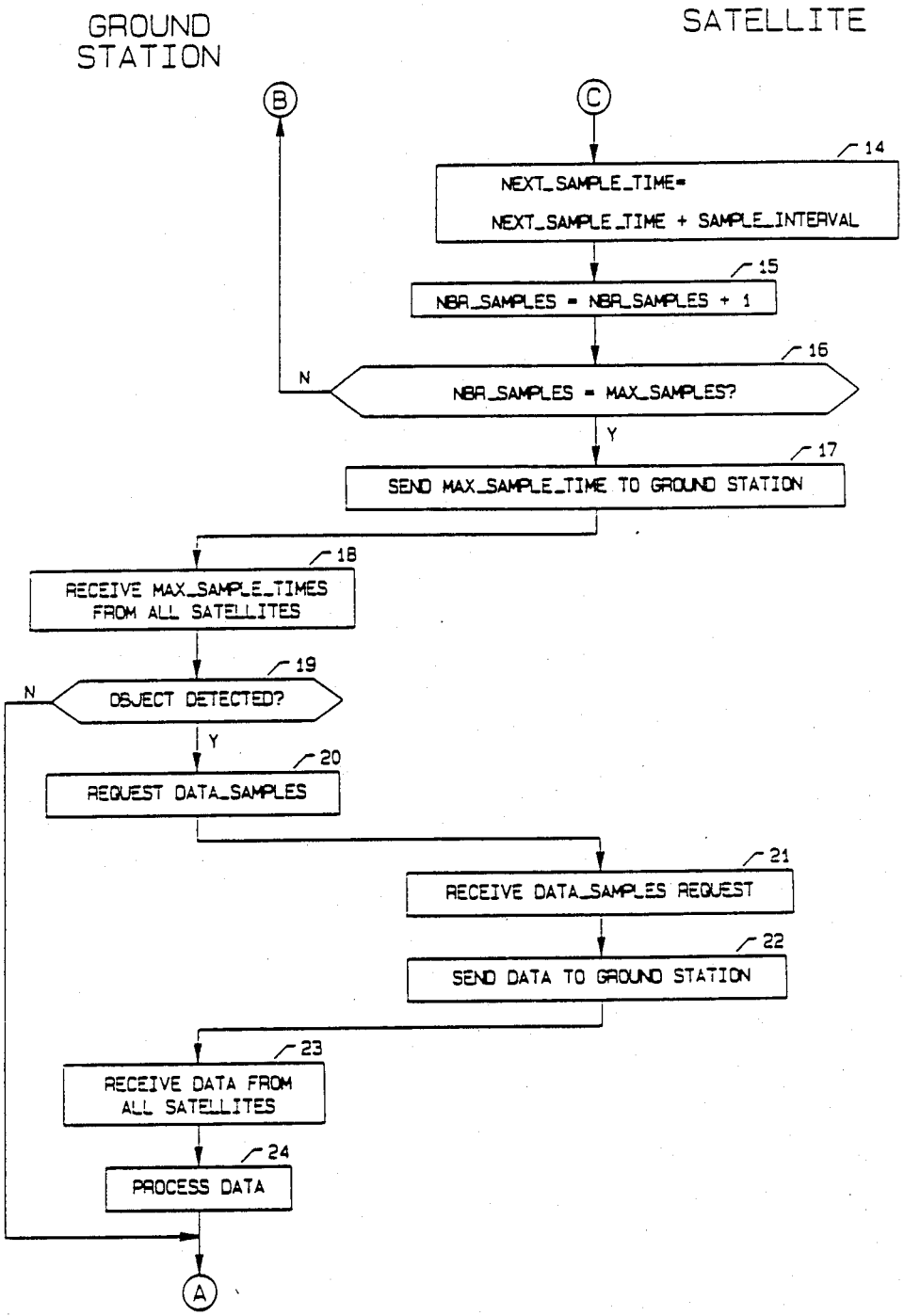
FIG. 10 is a flow chart showing the data acquisition, data processing and time synchronization steps involved in the coordinated processing of radar signals from an object by each of the satellite stations.

As seen in FIG. 10, the ground station 1 sends a message to each of the satellites 3a, 3b, 3c specifying the (ground station master clock) time to emit the radar pulse (Step 1) and the duration of each of the time intervals thereafter at which samples of radar return signals are to be taken. Each satellite receives the message from the ground station (Step 2) and waits until its (slave) clock reaches the specified pulse emission time (Step 3). When the specified emission time is reached, a pulse is emitted by each of the radar dishes 4a, 4b and 4c (Step 4). Each satellite then initializes a number of data collection variables (Steps 5, 6, 7). To begin sampling the data immediately, the satellite sets the first sampling time to the time the pulse was emitted (Step 8).

Each satellite then waits until its (frequency adjusted) slave) clock reaches the first specified sampling time, i.e. at the expiration of the previously specified interval time at which samples are to be taken (Step 9). When the sampling time is reached, the satellite reads a data sample from its radar dish 4a, 4b or 4c via the A/D converter 17 (Step 10).

The satellite repeats this process, comparing each data sample to the previously stored (maximum) data sample (Step 11). If the new sample is greater than the previously stored maximum, the satellite updates the recorded maximum value (Step 12) and the time of arrival of the new maximum value (Step 13). The satellite then computes the time of arrival of the next data sample (Step 14), increments the number of data samples collected (Step 15), and tests if all the desired samples have been collected (Step 16).

After all the data has been collected, the satellite sends the maximum amplitude radar signal receipt time to the ground station (Step 17). The ground station receives the maximum amplitude radar signal receipt time for each satellite (Step 18), compares the samples from all satellites, and decides if a significant event was detected (Step 19).

If no event was detected, the process repeats when the ground station 1 requests another radar pulse to be emitted (Step 1).

If an event was detected, the ground station requests that the satellites transmit their data streams to the ground station for analysis (Step 20). Each satellite receives the request (Step 21) and sends the data to the ground station (Step 22), where it is received (Step 23) and processed (Step 24).

The total process repeats when the ground station sends the satellites a request for another radar pulse to be emitted (Step 1).

Determination of a Global Time Reference

In some systems it may be desirable to determine the virtual (master) clock reference from the average of the reference times of all clocks in the system; and to establish the virtual (master) clock frequency as the average of the frequencies of all clocks in the system. For the previous example, assume the ground station utilizes the same correction equation as the satellites, but starts with $k_{clkratio} = 1$ and $t_{ref} = 0$.

Figure 11:
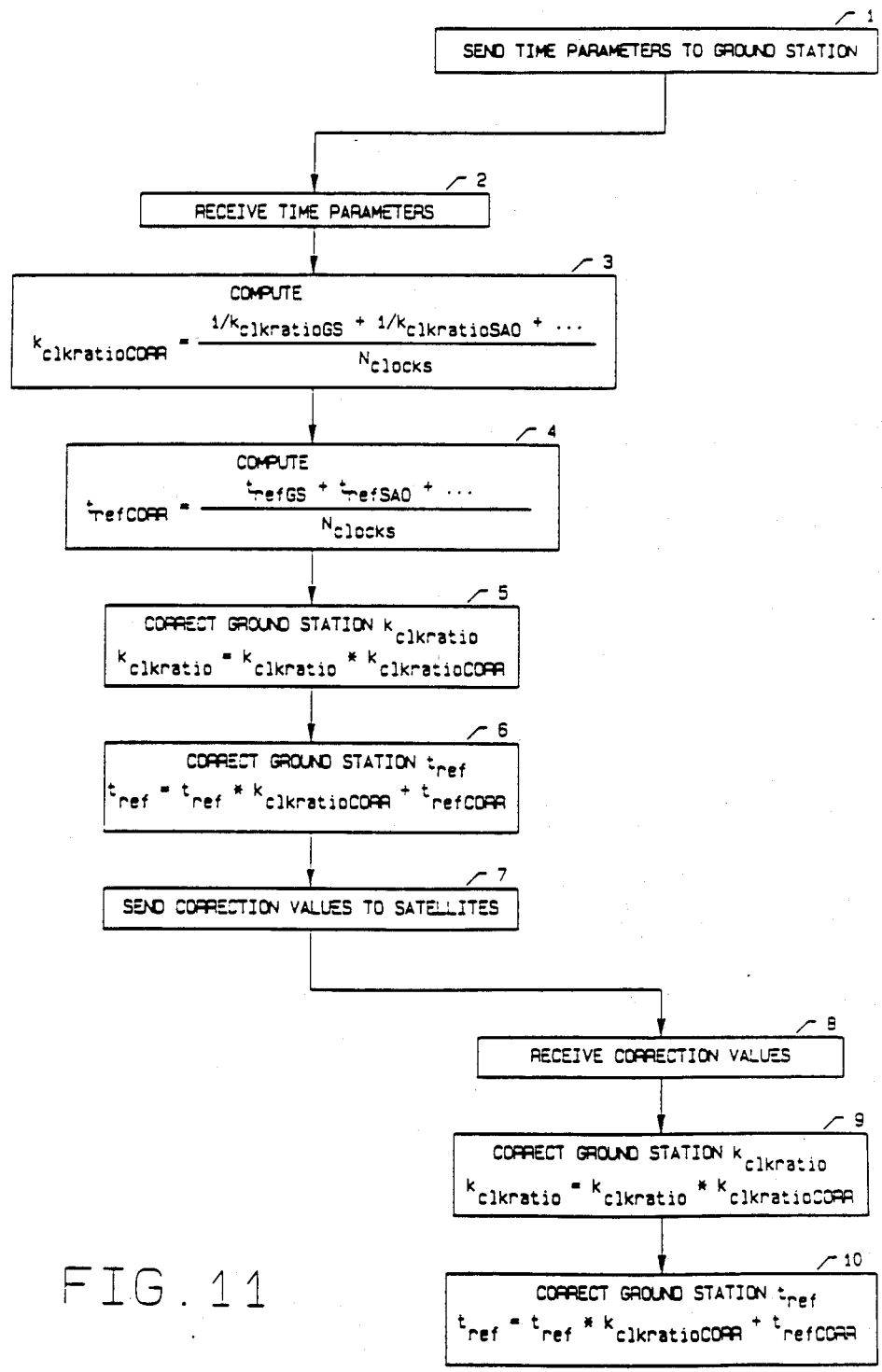
FIG. 11 is a flow chart showing synchronization signal processing in each satellite station and the ground station, to provide an optional feature of the invention wherein the master clock at the ground station is set to a reference time which corresponds to the average of the reference times of the various stations, and is operated at an effective frequency corresponding to the average of the frequencies of the various clocks in the system.

After the satellites have determined their parameters relative to the ground station, an average of the parameters can be computed and used to determine the new virtual (master) clock parameters, utilizing the method depicted in FIG. 11.

The satellites send their parameters $t_{ref}$ and $k_{clkratio}$ to the ground station (Step 1).

The ground station receives the time parameters (Step 2) and computes the correction factor (Step 3) for $k_{clkratio}$ such that the virtual clock frequency will be the average of all the clock frequencies in the system, utilizing Equation 47.

$$k_{clkratioCORR} = \frac{1/k_{clkratioGS} + 1/k_{clkratioSAO} + \cdots}{N_{clocks}} \quad (47)$$

The ground station then computes the correction factor (Step 4) for $t_{ref}$ such that the virtual (master) clock reference time will be the average of the reference times of all clocks in the system, utilizing Equation 48.

$$t_{refCORR} = \frac{t_{refGS} + t_{refSAO} + \cdots}{N_{clocks}} \quad (48)$$

The ground station then corrects its clock frequency parameter by applying the average values of $k_{clkratio}$ (Step 5/Equation 49); and corrects its reference time parameter by applying the average of the reference times (Step 6/Equation 50).

$$k_{clkratio} = k_{clkratio} * k_{clkratioCORR} \quad (49)$$

$$t_{ref} = t_{ref} * k_{clkratioCORR} + t_{refCORR} \quad (50)$$

As previously described, the ground station then transmits the time parameter correction values to each of the satellites (Step 7). These signals are received by the satellites (Step 8) and the frequency and reference time parameters of the satellite (slave) clocks are corrected (Steps 9, 10).

Non-Linear Modelling

The model of time utilized in the method described in this application makes a number of assumptions which are normally true, including: a linear relationship between the variables, a stable oscillator driving the clocks, and a constant average transmission time $T_{TRavg}$.

The assumptions may not be sufficiently accurate in some applications where special conditions exist and an extremely high degree of precision is required. In order to adjust for such conditions, the satellites can plot the data used in the time correction algorithm and search for patterns. If patterns are found, e.g. predictable long term fluctuations in the oscillator frequency, they can be corrected for by a more sophisticated model of time using known curve fitting techniques. Similarly, the system can use information about the clocks, their operation and their interrelationship in the derivation of the time parameters.

Cascading of Slave Clocks

It is not necessary for a particular slave clock to communicate directly with the master clock in order to enable that slave clock to be synchronized to the master clock. Rather, an auxiliary slave clock can communicate with an intermediate slave clock which in turn communicates with the master clock.

When this indirect or cascaded arrangement is employed, a primary clock ratio of the frequency of the master clock to the frequency of the intermediate slave clock is determined as previously described; and a primary reference time equal to the difference between the master and intermediate slave clocks is also determined as previously described.

Similarly, with the intermediate slave clock acting as a "master" clock and the auxiliary slave clock acting as a "conventional" slave clock, a secondary clock ratio of the frequency of the intermediate slave clock to the frequency of the auxiliary slave clock is determined as previously described; and a secondary reference time equal to the difference between the intermediate and auxiliary slave clocks is also determined as previously described.

The auxiliary slave clock then is synchronized to the master clock utilizing a composite reference time and clock ratio instead of conventional reference time and clock ratio values. The composite reference time is equal to the sum of the primary reference time and the seconding reference time multiplied by the primary clock ratio, and the composite clock ratio is equal to the product of the primary and secondary clock ratios.

For example, if the master clock is running at a frequency of 1.00 MHz., the intermediate slave clock is running at 2.00 MHz. and the auxiliary slave clock is running at 6.00 MHz., the primary clock ratio would be 0.5 and the secondary clock ratio would be 0.333, for a composite clock ratio of 0.16666; and this clock ratio would be used in the manner previously described in this application, to synchronize the auxiliary slave clock to the master clock, just as though the auxiliary clock were a "conventional" slave clock.

Similarly, if the master clock—intermediate slave clock primary reference time is 1.00 and the intermediate slave clock—auxiliary slave clock secondary reference time is 2.00, the composite reference time would be 2.00, i.e. 2.00 * 0.5 + 1.00; and this reference time value would be used in the manner previously described in this application, to synchronize the auxiliary slave clock to the master clock, just as though the auxiliary clock were a "conventional" slave clock.

Other Variations

While the invention has been described in terms of specific embodiments, it is evident that there are numerous variations which are within the scope of the present invention.

For example, while the embodiments have been described in terms of synchronizing one or more slave clocks to a master clock in such a manner that each slave clock is adjusted to keep master clock time, the reciprocal arrangement is inherent in the present invention.

That is, the master clock can be synchronized to any slave clock using the same techniques that have already been described. That is, at the master clock the value of the slave clock time signal of a particular slave clock corresponding to a given master clock time value MT can be determined according to the relation $$n_{pc} = (MT - t_{ref})/k_{clkratio} \qquad (54)$$

where $n_{pc}$ is the number of increments of the slave clock time signal.

Using the above technique, the master clock could specify the time it wants the slave clock to initiate a particular event (such as the transmission of a radar pulse) in (unadjusted) slave clock time instead of master clock time.

Another variation is the use of the reference time at a point other than the starting time of the slave clock being referenced. As previously discussed, the reference time $t_{ref}$ is the difference between the time values of the master and slave clocks at a particular moment. The previously presented equations involving reference time are based upon that moment being the starting time of the slave clock, i.e. when the time value of the slave clock is zero; and as previously described for many applications it is preferred that the determination of $t_{ref}$ correspond to this moment.

It should be kept in mind, however, that while the value of $t_{ref}$ corresponds to the difference between the master and slave clock time signal values at a particular slave clock (or master clock) time (here the slave clock starting time), the communications and calculations required to determine this value of $t_{ref}$ may be performed at any desired time.

However, it is not necessary that $t_{ref}$ be determined as the difference between the master and slave clock time signal values at the starting time of the slave clock. The reference time $t_{ref}$ can be determined as said difference at any slave clock time, so long as the slave clock time increments are adjusted for any difference between the master and slave clock frequencies on the basis of the number of slave clock time signal increments between the slave clock time signal and the slave clock time signal value corresponding to the time of determination of the reference time.

That is, if the reference time is determined to correspond to the difference between the master and slave clock time signal values when the slave clock has generated $n_{pc0}$ time signal increments from its starting time, then the master or virtual clock time $T_{vc}$ when the slave clock has generated a total of $n_{pc}$ time signal increments from its starting time is given by $$T_{vc} = t_{ref} + n_{pc0} + (n_{pc} - n_{pc0}) * k_{clkratio} \quad (55)$$

In the particular case where the reference time is determined to correspond to the difference between the master and slave clock time signal values at the starting time of the slave clock, $n_{pc0} = 0$ and Equation (55) reduces to Equation (5).

We claim:

1. A method for referencing at least one slave clock to a master clock, said master clock providing a master clock time signal, said slave clock providing a periodically incremented slave clock time signal, said method comprising the steps of:
   (1) transmitting from said slave clock to said master clock a first time signal having a value $ST_0$ corresponding to the value of said slave clock time signal when said first time signal is transmitted;
   (2) determining a value $MT_0$ of said master clock time signal when said first time signal is received by said master clock;
   (3) subsequently transmitting from said master clock to said slave clock a second time signal having the value $MT_0$;
   (4) subsequently transmitting from said master clock to said slave clock a third time signal having a value $MT_1$ corresponding to the value of said master clock time signal when said third time signal is transmitted;
   (5) determining a value $ST_1$ of said slave clock time signal when said third time signal is received by said slave clock;
   (6) upon receipt of said second and third time signals at said slave clock, determining a virtual clock reference time $t_{ref}$ given by $$t_{ref} = [(MT_0 + MT_1) - (ST_0 + ST_1) * k_{clkratio}]/2$$

where $k_{clkratio} = (MT_1 - MT_0)/(ST_1 - ST_0)$; and (7) at said slave clock, generating a virtual clock time signal having a value $T_{vc}$ synchronized to said master clock time signal, the value $T_{vc}$ of said virtual clock time signal being given by $$T_{vc} = t_{ref} + n_{pc} * k_{clkratio}$$

where $n_{pc}$ is the number of slave clock time signal increments.

2. A method for referencing at least one slave clock to a master clock, said master clock providing a master clock time signal, said slave clock providing a periodically incremented slave clock time signal, said method comprising the steps of:
   (1) transmitting from said slave clock to said master clock a first time signal having a value $ST_0$ corresponding to the value of said slave clock time signal when said first time signal is transmitted;
   (2) determining a value $MT_0$ of said master clock time signal when said first time signal is received by said master clock;
   (3) subsequently transmitting from said master clock to said slave clock a second time signal having the value $MT_0$;
   (4) subsequently transmitting from said master clock to said slave clock a third time signal having a value $MT_1$ corresponding to the value of said master clock time signal when said third time signal is transmitted;
   (5) determining a value $ST_1$ of said slave clock time signal when said third time signal is received by said slave clock;
   (6) upon receipt of said second and third time signals at said slave clock, determining a virtual clock reference time $t_{ref}$ given by $$t_{ref} = [(MT_0 + MT_1) - (ST_0 + ST_1)]/2; \text{ and}$$

(7) at said slave clock, generating a virtual clock time signal having a value $T_{vc}$ synchronized to said master clock time signal, the value $T_{vc}$ of said virtual clock time signal being given by $$T_{vc} = t_{ref} + n_{pc}$$

where $n_{pc}$ is the number of slave clock time signal increments.

3. A method for referencing at least one slave clock to a master clock, said master clock providing a master clock time signal, said slave clock providing a periodically incremented slave clock time signal, said method comprising the steps of:
   (1) transmitting from said slave clock to said master clock a first time signal having a value corresponding to the value of said slave clock time signal when said first time signal is transmitted;
   (2) subsequently transmitting from said master clock to said slave clock (i) a second time signal having a value corresponding to the value of said master clock time signal when said first time signal was received by said master clock, and (ii) a third time signal having a value corresponding to the value of said master clock time signal when said third time signal is transmitted;
   (3) upon receipt of said second and third time signals at said slave clock, determining (i) the reference time value required to reference the slave clock to the master clock and (ii) the clock ratio $k_{clkratio}$ of the frequency of the master clock to the frequency of the slave clock; and
   (4) at said slave clock, generating a virtual clock time signal having a value $T_{vc}$ synchronized to said master clock time signal, the value $T_{vc}$ of said virtual clock time signal being given by $$T_{vc} = t_{ref} + n_{pc} * k_{clkratio}$$

where $n_{pc}$ is the number of slave clock time signal increments.

4. A method for referencing at least one slave clock to a master clock, said master clock providing a master clock time signal, said slave clock providing a periodically incremented slave clock time signal, said method comprising the steps of:
   (1) transmitting a number of first reference time signals from the slave clock to the master clock;
   (2) accumulating at the master clock time values corresponding to the times of reception of said first reference time signals as measured by the master clock;
   (3) subsequently transmitting a number of second reference time signals from said master clock to said slave clock;

(4) accumulating at the master clock time values corresponding to the times of transmission of said second reference time signals as measured by the master clock;

(5) accumulating at the slave clock time values corresponding to (i) the times of transmission of said first reference time signals as measured by the slave clock, and (ii) the times of reception of said second reference time signals as measured by the slave clock;

(6) transmitting from the master clock to the slave clock a signal having a value corresponding to a weighted sum of the master clock time values accumulated at Steps (2) and (4);

(7) computing a reference time $t_{ref}$ of the sleeve clock relative to the master clock from said weighted sum and a weighted sum of the slave clock time values accumulated at Step (5); and (8) at said slave clock, generating a virtual clock time signal having a value $T_{vc}$ synchronized to said master clock time signal, the value $T_{vc}$ of said virtual clock time signal being given by $$T_{vc} = t_{ref} + n_{pc}$$

where $n_{pc}$ is the number of slave clock time signal increments.

5. The method according to claim 3 or 4, comprising the steps of:

transmitting from said master clock to said slave clock a time interval commencement signal having a value corresponding to the value of said master clock time signal when said time interval commencement signal is transmitted;

subsequently transmitting from said master clock to said slave clock a time interval termination signal having a value corresponding to the value of said master clock time signal when said time interval termination signal is transmitted;

after receipt of said time interval termination signal at said slave clock, determining the value of the clock ratio of the frequency of the master clock to the frequency of the slave clock as the ratio of (i) the difference between the values of said time interval termination and time interval commencement signals to (ii) the elapsed time between reception of said time interval commencement and time interval termination signals as determined by said slave clock; and generating said virtual clock time signal utilizing the clock ratio so determined to compensate for any difference in frequency between the master clock and the slave clock.

6. A method for referencing at least one slave clock to a master clock, said master clock providing a master clock time signal, said slave clock providing a periodically incremented slave clock time signal, said method comprising the steps of:

(1) transmitting from said master clock to said slave clock a time interval commencement signal having a value corresponding to the value of said master clock time signal when said time interval commencement signal is transmitted;

(2) subsequently transmitting from said master clock to said slave clock a time interval termination signal having a value corresponding to the value of said master clock time signal when said time interval termination signal is transmitted; and (3) after receipt of said time interval termination signal at said slave clock, generating a virtual clock time signal having a value which increases with time by an amount proportional to the product of the number of slave clock time signal increments and the clock ratio of (i) the difference between the values of said time interval termination and time interval commencement signals to (ii) the elapsed time between reception of said time interval commencement and time interval termination signals as determined by said slave clock.

7. The method according to claim 6, comprising the additional steps of repeating the transmission of said time interval termination signal a number of times, determining each new corresponding value of said clock ratio utilizing said time interval commencement signal and the most recent time interval termination signal, and generating a virtual clock time signal having a value which increases with time by an amount proportional to the product of the number of slave clock time signal increments and the most recently determined new value of said clock ratio.

8. A method for referencing a plurality of slave clocks to a master clock, said master clock providing a master clock time signal, each slave clock providing a periodically incremented slave clock time signal, said method comprising the steps of:

(1) transmitting from each slave clock to said master clock a first time signal having a value corresponding to the value of said slave clock time signal when said first time signal is transmitted;

(2) subsequently transmitting from said master clock to said slave clock a time interval termination signal having a value corresponding to the value of said master clock time signal when said time interval termination signal is transmitted; and (3) after receipt of said time interval termination signal at said slave clock, generating a virtual clock time signal having a value which increases with time by an amount proportional to the product of the number of slave clock time signal increments and the clock ratio of (i) the difference between the values of said time interval termination and time interval commencement signals to (ii) the elapsed time between reception of said time interval commencement and time interval termination signals as determined by said slave clock.

9. The method according to claim 8, comprising the additional step of determining a virtual clock reference time value equal to the average of the reference time values.

10. A method for referencing a plurality of slave clocks to a master clock, said master clock providing a master clock time signal, each slave clock providing a periodically incremented slave clock time signal, said method comprising the steps of:

(1) transmitting from said master clock to each slave clock a time interval commencement signal having a value corresponding to the value of said master clock time signal when said time interval commencement signal is transmitted;

(2) subsequently transmitting from said master clock to each slave clock a time interval termination signal having a value corresponding to the value of said master clock time signal when said time interval termination signal is transmitted; and (3) after receipt of said time interval termination signal at each slave clock, generating a virtual clock time signal having a value which increases with time by an amount proportional to the product of the number of slave clock time signal increments and the clock ratio of (i) the difference between the values of said time interval termination and time interval commencement signals to (ii) the elapsed time between reception of said time interval commencement and time interval termination signals as determined by the corresponding slave clock.

11. The method according to claim 10, comprising the additional step of generating at one or more of said clocks an adjusted time signal having a value which increases with time at a rate corresponding to the average frequency of said clocks.

12. A method for determining the frequency relationship between at least one slave clock and a master clock, wherein the master clock provides a master clock time signal and the slave clock provides a slave clock time signal, said method comprising the steps of:

transmitting a time interval commencement signal from the master clock to the slave clock, the time interval commencement signal having a value corresponding to the value of the master clock time signal when the time interval commencement signal is transmitted;

subsequently transmitting a time interval termination signal from the master clock to the slave clock, the time interval termination signal having a value corresponding to the value of the master clock time signal when the time interval termination signal is transmitted;

after receipt of the time interval termination signal at the slave clock, generating a virtual clock time signal having a value which increases with time by an amount proportional to the product of the number of slave clock time signal increments and the clock ratio of the two clock frequencies as the ratio of (i) the difference between the values of the time interval commencement and time interval termination signals to (ii) the elapsed time between reception of the time interval commencement and time interval termination signals as determined by the slave clock.

13. The method according to claim 12, comprising the additional steps of repeating the transmission of said time interval termination signal a number of times, determining at each corresponding termination signal a new value of said clock ratio, and generating a virtual clock time signal having a value which increases with time by an amount proportional to the product of the number of slave clock time signal increments and the ratio of (i) the difference between the values of the time interval commencement signal and the most recent time interval termination signal to (ii) the elapsed time between reception of the time interval commencement signal and said most recent time interval termination signal.

14. A method for establishing a reference time of at least one slave clock to correspond with the reference time of a master clock, wherein the master clock provides a master clock time signal and the slave clock provides a slave clock time signal, said method comprising the steps of:

transmitting a first reference time signal from the slave clock to the master clock, said first reference signal having a value corresponding to the value of the slave clock time signal when the first reference time signal is transmitted;

subsequently transmitting a second reference time signal from the master clock to the slave clock, said second reference time signal having a value corresponding to the value of the master clock time signal when the first reference time signal was received by the master clock;

transmitting a third reference time signal from the master clock to the slave clock, said third reference time signal having a value corresponding to the value of the master clock time signal when the third reference time signal is transmitted;

after receipt of the third reference time signal at the slave clock, determining the reference time value by:

adding the value of said slave clock time signal at the time of transmission of said first reference signal, to the value of said slave clock time signal at the time of reception of said third reference signal at said slave clock, to obtain a first subtotal value;

subtracting said first subtotal value from the sum of the values of said second and third reference time signals, to obtain a second subtotal value;

dividing said second subtotal value by two to obtain a reference time value $t_{ref}$; and at said slave clock, generating a virtual clock time signal $T_{vc}$ having a value synchronized to said master clock time signal, the value $T_{vc}$ of said virtual clock time signal being given by $$T_{vc} = t_{ref} + n_{pc}$$

where $n_{pc}$ is the number of slave clock time signal increments.

15. The method according to claim 14, comprising the additional steps of:

prior to said subtracting step, modifying said first subtotal value by multiplying said first subtotal value by the ratio of the frequency of said master clock to the frequency of said slave clock, to obtain an adjusted first subtotal value; and utilizing said adjusted first subtotal value instead of said first subtotal value in said subtracting step, so that the value of said virtual clock time signal is given by the relation $$T_{vc} = t_{ref} + n_{pc} * k_{clkratio}.$$

16. The method according to claim 14 or 15, comprising the additional steps of:

(1) transmitting a number of said first reference time signals from the slave clock to the master clock;

(2) accumulating at the master clock time values corresponding to the times of reception of said first reference time signals as measured by the master clock;

(3) subsequently transmitting a number of said third reference time signals from said master clock to said slave clock;

(4) accumulating at the master clock time values corresponding to the times of transmission of said third reference time signals as measured by the master clock;

(5) accumulating at the slave clock time values corresponding to (i) the times of transmission of said first reference time signals as measured by the slave clock, and (ii) the times of reception of said third reference time signals as measured by the slave clock;

(6) transmitting from the master clock to the slave clock a signal having a value corresponding to a weighted sum of the master clock time values accumulated at Steps (2) and (4);

(7) computing the reference time $t_{ref}$ of the slave clock relative to the master clock from said weighted sum and a weighted sum of the slave clock time values accumulated at Step (5); and (8) at said slave clock, generating a virtual clock time signal having a value synchronized to said master clock time signal, the value $T_{vc}$ of said virtual clock time signal being given by $$T_{vc} = t_{ref} + n_{pc} * k_{clkratio}$$

where $n_{pc}$ is the number of slave clock time signal increments and $k_{clkratio}$ is the ratio of the frequency of the master clock to the frequency of the slave clock.

17. A method for determining the transmission time between a slave clock and a master clock and generating a virtual clock time signal which is synchronized to the master clock, wherein the master clock provides a master clock time signal and the slave clock provides a slave clock time signal, said method comprising the steps of:

transmitting a first reference time signal from the slave clock to the master clock, said first reference time signal having a value corresponding to the value of the slave clock time signal when the first reference time signal is transmitted;

subsequently transmitting a second reference time signal from the master clock to the slave clock, said second reference time signal having a value corresponding to the value of the master time clock signal when the first reference time signal was received by the master clock;

transmitting a third reference time signal from the master clock to the slave clock, said third reference time signal having a value corresponding to the value of the master clock time signal when the third reference time signal is transmitted;

after receipt of the third reference time signal at the slave clock, determining the value of the time required for transmission of a signal between the master and slave clocks by:

subtracting the value of said third reference time signal from the value of said second reference time signal, to obtain a first subtotal value;

subtracting the value of said slave clock time signal at the time of transmission of said first reference time signal from the value of said slave clock time signal at the time of reception of said third reference time signal at said slave clock, to obtain a second subtotal value;

adding said first subtotal value to said second subtotal value to obtain a summation value, and dividing the summation value by two to obtain the transmission time value; and generating a virtual clock time signal by adjusting the value of said slave clock time signal by an amount equal to the sum of (i) a master clock time signal value received by the slave clock after transmission thereto by the master clock and (ii) said transmission time less (iii) the value of said slave clock time signal.

18. The method according to claim 17, comprising the additional steps of:

prior to said adding step, modifying said second subtotal value by multiplying said second subtotal value by the ratio of the frequency of said master clock to the frequency of said slave clock, to obtain an adjusted second subtotal value; and utilizing said adjusted second subtotal value instead of said second subtotal value in said adding step.

19. The method according to claim 16 or 17, comprising the additional steps of:

(1) transmitting a number of said first reference time signals from the slave clock to the master clock;

(2) accumulating at the master clock time values corresponding to the times of reception of said first reference time signals as measured by the master clock;

(3) subsequently transmitting a number of said third reference time signals from said master clock to said slave clock;

(4) accumulating at the master clock time values corresponding to the times of transmission of said third reference time signals as measured by the master clock;

(5) accumulating at the slave clock time values corresponding to (i) the times of transmission of said first reference time signals as measured by the slave clock, and (ii) the times of reception of said third reference time signals as measured by the slave clock;

(6) transmitting from the master clock to the slave clock a signal having a value corresponding to a weighted difference of the master clock time values accumulated at Steps (2) and (4); and (7) computing the transmission time of the slave clock relative to the master clock from said weighted difference and a weighted difference of the slave clock time values accumulated at Step (5).

20. A method for referencing at least one slave clock to a master clock, said master clock providing a master clock time signal, said slave clock providing a periodically incremented slave clock time signal, said method comprising the steps of:

(1) transmitting from said slave clock to said master clock a time interval commencement signal having a value $ST_0$ corresponding to the value of said slave clock time signal when said time interval commencement signal is transmitted;

(2) determining a value $MT_0$ of said master clock time signal when said time interval commencement signal is received by said master clock;

(3) transmitting from said slave clock to said master clock a time interval termination signal having a value $ST_1$ corresponding to a value of said slave clock time signal when said time interval termination signal is transmitted;

(4) determining a value $MT_1$ of said master clock time signal when said time interval termination signal is received at said master clock;

(5) subsequently transmitting from said master clock to said slave clock a time signal containing information sufficient to define the value $MT_1 - MT_0$;

(6) upon receipt of said time interval termination signal at said slave clock, determining a ratio $k_{clkratio}$ of the frequency of the master clock to the frequency of the slave clock by means of the equation $k_{clkratio}=(MT_1-MT_0)/(ST_1-ST_0)$; and generating a virtual clock time signal having a value which increases with time by an amount proportional to the product of the number of slave clock time signal increments and $k_{clkratio}$.

21. A method for referencing at least one slave clock to a master clock, said master clock providing a master clock time signal, said slave clock providing a periodically incremented slave clock time signal, said method comprising the steps of:
  (1) transmitting from said master clock to said slave clock a time interval commencement signal having a value $MT_0$ corresponding to the value of said master clock time signal when said time interval commencement signal is transmitted;
  (2) determining a value $ST_0$ of said slave clock time signal when said time interval commencement signal is received by said slave clock;
  (3) transmitting from said master clock to said slave clock a time interval termination signal having a value $MT_1$ corresponding to the value of said master clock time signal when said time interval termination signal is transmitted;
  (4) determining a value $ST_1$ of said slave clock time signal when said time interval termination signal is received by said slave clock; and
  (5) upon receipt of said time interval termination signal at said slave clock, determining a ratio $k_{clkratio}$ of the frequency of the master clock to the frequency of the slave clock by means of the equation $$k_{clkratio}=(MT_1-MT_0)/(ST_1-ST_0); \text{ and}$$

generating a virtual clock time signal having a value which increases with time by an amount proportional to the product of the number of slave clock time signal increments and $k_{cklratio}$.

22. A method for referencing at least one slave clock to a master clock, said master clock providing a master clock time signal, said slave clock providing a periodically incremented slave clock time signal, said method comprising the steps of:
  (1) transmitting from said slave clock to said master clock a first time signal having a value $ST_0$ corresponding to the value of said slave clock time signal when said first time signal is transmitted;
  (2) determining a value $MT_0$ of said master clock time signal when said first time signal is received by said master clock;
  (3) subsequently transmitting from said master clock to said slave clock a second time signal having the value $MT_0$;
  (4) subsequently transmitting from said master clock to said slave clock a third time signal having a value $MT_1$ corresponding to the value of said master clock time signal when said third time signal is transmitted;
  (5) determining a value of $ST_1$ of said slave clock time signal when said third time signal is received by said slave clock;
  (6) upon receipt of said third time signal at said slave clock, determining a virtual clock reference time $t_{ref}$ given by $$t_{ref}=[(MT_0+MT_1)-(ST_0+ST_1)]/2; \text{ and}$$

(7) at said slave clock, generating a virtual clock time signal having a value $T_{vc}$ synchronized to said master clock time signal, the value of $T_{vc}$ of said virtual clock time signal being given by $$T_{vc}=t_{ref}+n_{pc}$$

where $n_{pc}$ is the number of periodic slave clock time increment signals generated.

23. The method according to claim 22, wherein the virtual clock reference time is adjusted for any difference between the frequencies of the master and slave clocks, comprising the steps of:
  at said Step (6), determining the virtual clock reference time $t_{ref}$ according to the equation $$t_{ref}=[(MT_0+MT_1)-(ST_0+ST_1) * k_{clkratio}]/2;$$

where $k_{clkratio}$ is the ratio of the frequency of said master clock to the frequency of said slave clock; and
  at said Step (7), generating a virtual clock time signal with a value $T_{vc}$ according to the equation $$T_{vc}=t_{ref}+n_{pc} * k_{clkratio}.$$

24. A method for referencing at least one slave clock to a master clock, said master clock providing a master clock time signal, said slave clock providing a periodically incremented slave clock time signal, said method comprising the steps of:
  (1) transmitting from said slave clock to said master clock a first time signal having a value $ST_0$ corresponding to the value of said slave clock time signal when said first time signal is transmitted;
  (2) determining a value $MT_0$ of said master clock time signal when said first time signal is received by said master clock;
  (3) subsequently transmitting from said master clock to said slave clock a second time signal having the value $MT_0$;
  (4) subsequently transmitting from said master clock to said slave clock a third time signal having a value $MT_1$ corresponding to the value of said master clock time signal when said third time signal is transmitted;
  (5) determining a value of $ST_1$ of said slave clock time signal when said third time signal is received by said slave clock;
  (6) upon receipt of said second and third time signals at said slave clock; determining a ratio $k_{clkratio}$ of the frequency of the master clock to the frequency of the slave clock according to the relation $$k_{clkratio}=(MT_1-MT_0)/(ST_1-ST_0); \text{ and}$$

(7) at said slave clock, multiplying the number of increments of said slave clock time signal by $k_{clkratio}$ to generate a virtual clock time signal having a value which increases with time at the same rate as said master clock time signal.

25. A method for referencing at least one slave clock to a master clock, said master clock providing a periodically incremented master clock time signal, said slave clock providing a periodically incremented slave clock time signal, said method comprising the steps of:
  sequentially transmitting a first set of signals from said slave clock to said master clock and a second set of signals from said master clock to said slave clock, at least one of said sets of signals containing the reference information respecting said time signals, the other of said sets of signals being indentifiable as having been transmitted from a corresponding one of said clocks;

at one of said clocks, determining a clock ratio of the frequency of said master clock to the frequency of said slave clock, by calculating the ratio of (i) the time interval between the times of transmission of two signals successively transmitted by one of said clocks as a transmitting clock to the other of said clocks as a receiving clock, as measured by the transmitting clock, to (ii) the time interval between the times of reception of said signals as measured by the receiving clock;

utilizing said clock ratio, said time reference information and information respecting the other of said sets of signals to determine a reference time value corresponding to the difference between the values of said master and slave clock time signals at a particular time corresponding to a predetermined value of said slave clock time signal; and at said slave clock, generating a virtual clock time signal by adjusting said slave clock time signal by an incremental amount corresponding to the product of the number of increments of said slave clock time signal between a current value of said slave clock time signal and said particular time and said clock ratio, and adding said reference time value to the adjusted slave clock time signal value.

26. A method for referencing at least one slave clock to a master clock, said master clock having a master clock time signal, said slave clock providing a periodically incremented slave clock time signal, said method comprising the steps of:

(1) transmitting from said slave clock to said master clock a first time signal having a value $ST_0$ corresponding to the value of said slave clock time signal when said first time signal is transmitted;

(2) determining a value $MT_0$ of said master clock time signal when said first time signal is received by said master clock;

(3) subsequently transmitting from said master clock to said slave clock a second time signal having the value $MT_0$;

(4) subsequently transmitting from said master clock to said slave clock a third time signal having a value $MT_1$ corresponding to the value of said master clock time signal when said third time signal is transmitted;

(5) determining a value $ST_1$ of said slave clook time signal when said third time signal is received by said slave clock;

(6) upon receipt of said third time signal at said slave clock, determining a transmission time given by $$T_{TR} = [(MT_0 - MT_1) + (ST_1 - ST_0)]/2;$$ and generating a virtual clock time signal by adjusting the value of said slave clock time signal by an amount equal to the sum of (i) a master clock time signal value received by the slave clock after transmission thereto by the master clock and (ii) said transmission time less (iii) the value of said slave clock time signal.

27. The method according to claim 26, wherein the calculation of transmission time is adjusted for any differences between the frequencies of the master and slave clocks, comprising the steps of:

at said Step (6), calculating the transmission time according to the equation $$T_{TR} = [(MT_0 - MT_1) + (ST_1 - ST_0) * k_{clkratio}]/2$$

where $k_{clkratio}$ is the ratio of the frequency of said master clock to the frequency of said slave clock; and generating said virtual clock time signal with a value $T_{vc}$ according to the relation $$T_{vc} = MT_1 + T_{TR} - ST_1 + n_{pc} * k_{clkratio}.$$

28. A method for referencing at least one slave clock to a master clock, said master clock providing a master clock time signal, said slave clock providing a periodically incremented slave clock time signal, said method comprising the steps of:

(1) transmitting from said slave clock to said master clock a first time signal having a value corresponding to the value of said slave clock time signal when said first time signal is transmitted;

(2) subsequently transmitting from said master clock to said slave clock (i) a second time signal having a value corresponding to the value of said master clock time signal when said first time signal was received by said master clock, and (ii) a third time signal having a value corresponding to the value of said master clock time signal when said third time signal is transmitted;

(3) upon receipt of said second and third time signals at said slave clock, determining a reference time value required to reference the slave clock to the master clock; and (4) generating an adjusted slave clock time signal synchronized to said master clock time signal by adding said reference time value to the value of said slave clock time signal.

29. The method according to claim 28, comprising the steps of incrementing the value of said slave clock time signal at a rate corresponding to the product of the value of said slave clock time signal with the ratio of the frequency of said master clock to the frequency of said slave clock, and adding said reference time value to the incremented value of said slave clock time signal.

30. The method according to claim 29, wherein said ratio is determined by calculating the ratio of (i) the time interval between the times of transmission of two signals successively transmitted between the master and slave clocks as measured by one of said clocks to (ii) the time interval between the times of reception of said signals as measured by the other of said clocks.

31. A method for synchronizing at least one slave clock to a master clock, said master clock providing a master clock time signal, said slave clock providing a periodically incremented slave clock time signal, said method comprising the steps of:

sequentially transmitting a first set of signals from said slave clock to said master clock and a second set of signals from said master clock to said slave clock, said second set of signals containing time reference information respecting said time signals;

at said slave clock, utilizing said time reference information and information respecting said first set of signals to adjust the slave clock time signal to be synchronous with the master clock time signal, so that the adjusted value of said slave clock time signal is equal to the value of said master clock time signals; and incrementing the adjusted value of said slave clock time signal at a rate corresponding to the product of the number of slave clock time signal increments with the ratio of the frequency of said master clock to the frequency of said slave clock.

32. The method according to claim 31, comprising the additional step of determining said ratio as the ratio of (i) the time interval between the times of transmission of two signals successively transmitted between the master and slave clocks as measured by one of said clocks to (ii) the time interval between the times of reception of said signals as measured by the other of said clocks.

33. A method for referencing at least one slave clock to a master clock, said master clock providing a master clock time signal, said slave clock providing a periodically incremented slave clock time signal, and method comprising the steps of:

(1) transmitting from said slave clock to said master clock a first time signal having a value $ST_0$ corresponding to the value of said slave clock time signal when said first time signal is transmitted;

(2) determining a value $MT_0$ of said master clock time signal when said first time signal is received by said master clock;

(3) subsequently transmitting from said master clock to said slave clock a time information signal indicative of the difference $MT_1 - MT_0$ between (i) the value $MT_1$ of said master clock time signal when said time information signal is transmitted and (ii) the value $MT_0$;

(4) determining a value $ST_1$ of said slave clock time signal when said third time signal is received by said slave clock;

(5) upon receipt of said second and third time signals at said slave clock, determining a ratio $k_{clkratio}$ of the frequency of the master clock to the frequency of the slave clock according to the relation $$k_{clkratio} = (MT_1 - MT_0)/(ST_1 - ST_0); \text{ and}$$

(7) at said slave clock, multiplying the number of increments of said slave clock time signal by $k_{clkratio}$ to generate a virtual clock time signal having a value which increases with time at the same rate as said master clock time signal.

* * * * *